Sept. 26, 1944.　　　　G. A. LYON　　　　2,358,984
PROCESS OF FORMING WHEEL HUB CAPS
Filed March 26, 1940　　　3 Sheets-Sheet 1
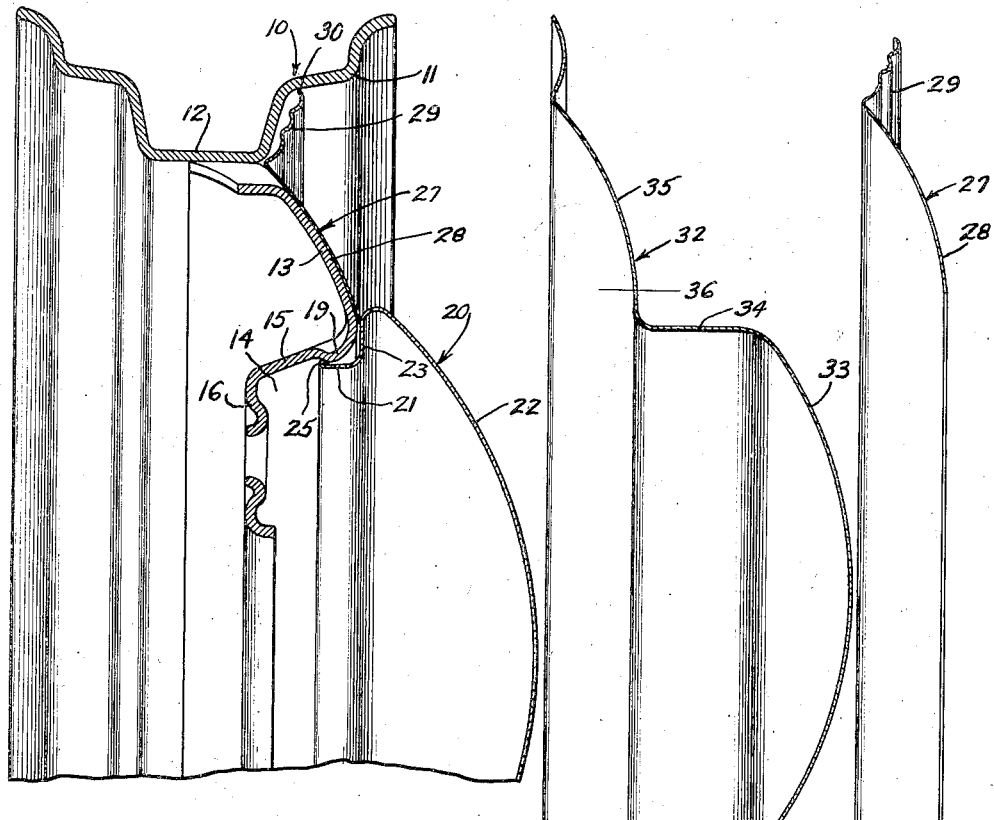
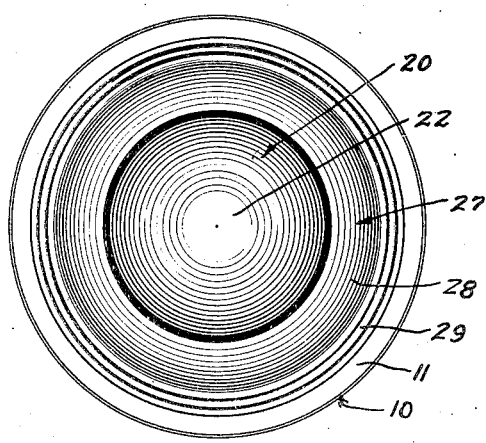
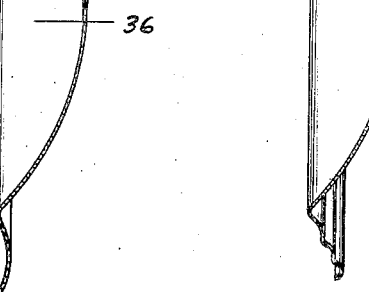
INVENTOR
GEORGE ALBERT LYON.

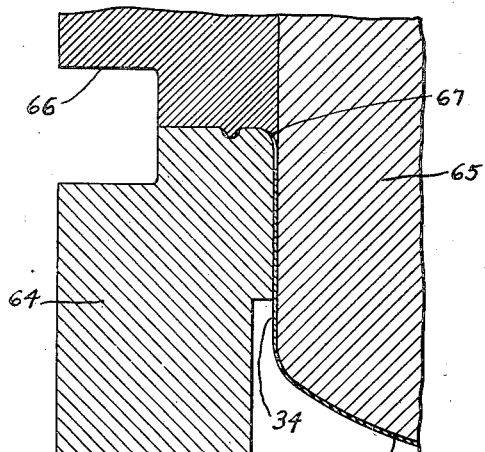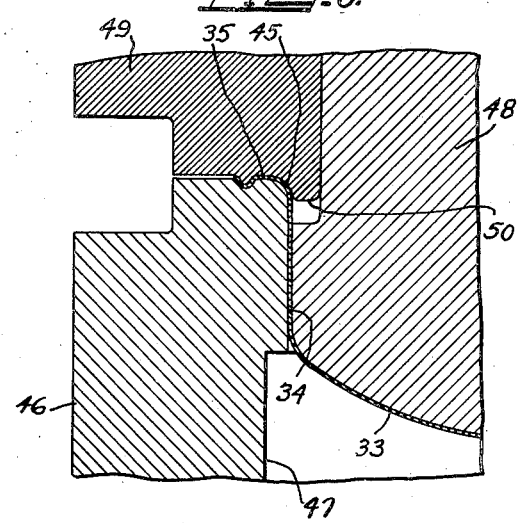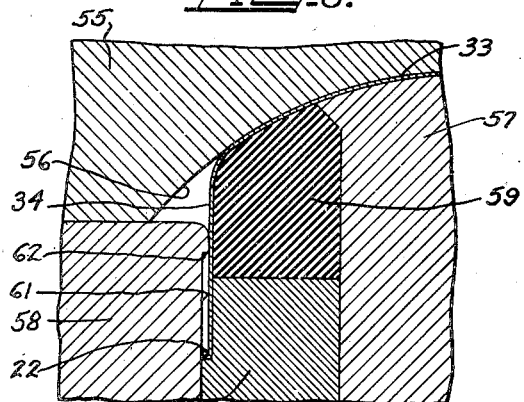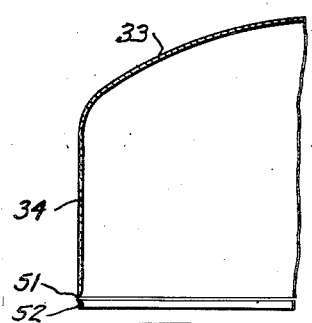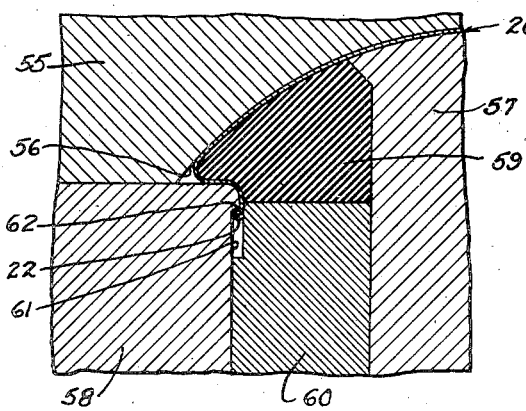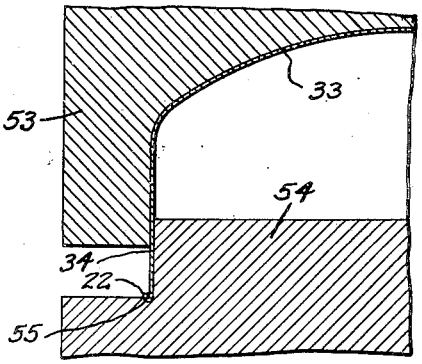
Inventor
George Albert Lyon Sept. 26, 1944.  G. A. LYON  2,358,984
PROCESS OF FORMING WHEEL HUB CAPS
Filed March 26, 1940  3 Sheets-Sheet 3

Inventor
GEORGE ALBERT LYON.

Patented Sept. 26, 1944

2,358,984

UNITED STATES PATENT OFFICE 2,358,984

PROCESS OF FORMING WHEEL HUBCAPS

George Albert Lyon, Allenhurst, N. J.

Application March 26, 1940, Serial No. 326,037

5 Claims. (Cl. 29—159)

This invention relates to an automobile wheel construction and, more particularly, to the method of making a hub cap forming a portion of such a construction. In particular, this invention relates to a process of making hub caps of the type shown in my copending application entitled "Wheel cover member and method of making same" filed February 20, 1939, Serial No. 257,425.

An object of this invention is to provide an improved and simplified method of making a cover member or hub cap for an automobile wheel.

Another object of this invention is to provide a method of making an automobile wheel hub cap of the type specified with less waste of metal than has been involved in the process hitherto known.

Another object of this invention is to provide a method of making an automobile wheel hub cap of the type specified in fewer operations than in the processes hitherto known.

Another object of this invention is to provide a method of forming an automobile wheel hub cap and a wheel cover disk from a single circular blank of metal.

In accordance with the general features of this invention, the blank, or the portion of the blank, for forming the hub cap is first drawn, by one or more operations, into an intermediate form having a crown portion surrounded by a cylindrical wall. The free edge of the cylindrical wall is then trimmed to eliminate any irregularities produced by the drawing operation and curled to form a beaded edge. The final operation consists in bulging out the portion of the cylindrical wall next to the crown portion to give the hub cap its final shape. During this last operation, the beaded edge is positively prevented, by suitable dies, from being drawn into an irregular shape so that no additional straightening or trimming operations are necessary.

In previous processes of making hub caps of the type to which this invention relates, it has been the practice to perform the bulging-out operation before curling the edge of the metal and without preventing the formation of irregularities in the edge of the metal. It has therefore been necessary to perform a second trimming operation after the bulging-out operation and before the curling of the edge of the metal into a bead.

Other objects and features of this invention will more fully appear from the following description, taken in connection with the accompanying drawings which illustrate the preferred manner of carrying out the invention, together with some modifications thereof, and in which:

Figure 1 is a partial vertical cross sectional view taken through a wheel construction embodying a hub cap and a wheel disk produced in accordance with my invention;

Figure 2 is a front view, on a reduced scale, of the wheel construction shown in Figure 1;

Figure 3 is a cross sectional view illustrating one of the first steps in the process of forming the wheel disk cover and hub cap shown in Figures 1 and 2;

Figure 4 is a cross sectional view illustrating a further step in the formation of the wheel disk cover shown in Figures 1 and 2;

Figure 11:
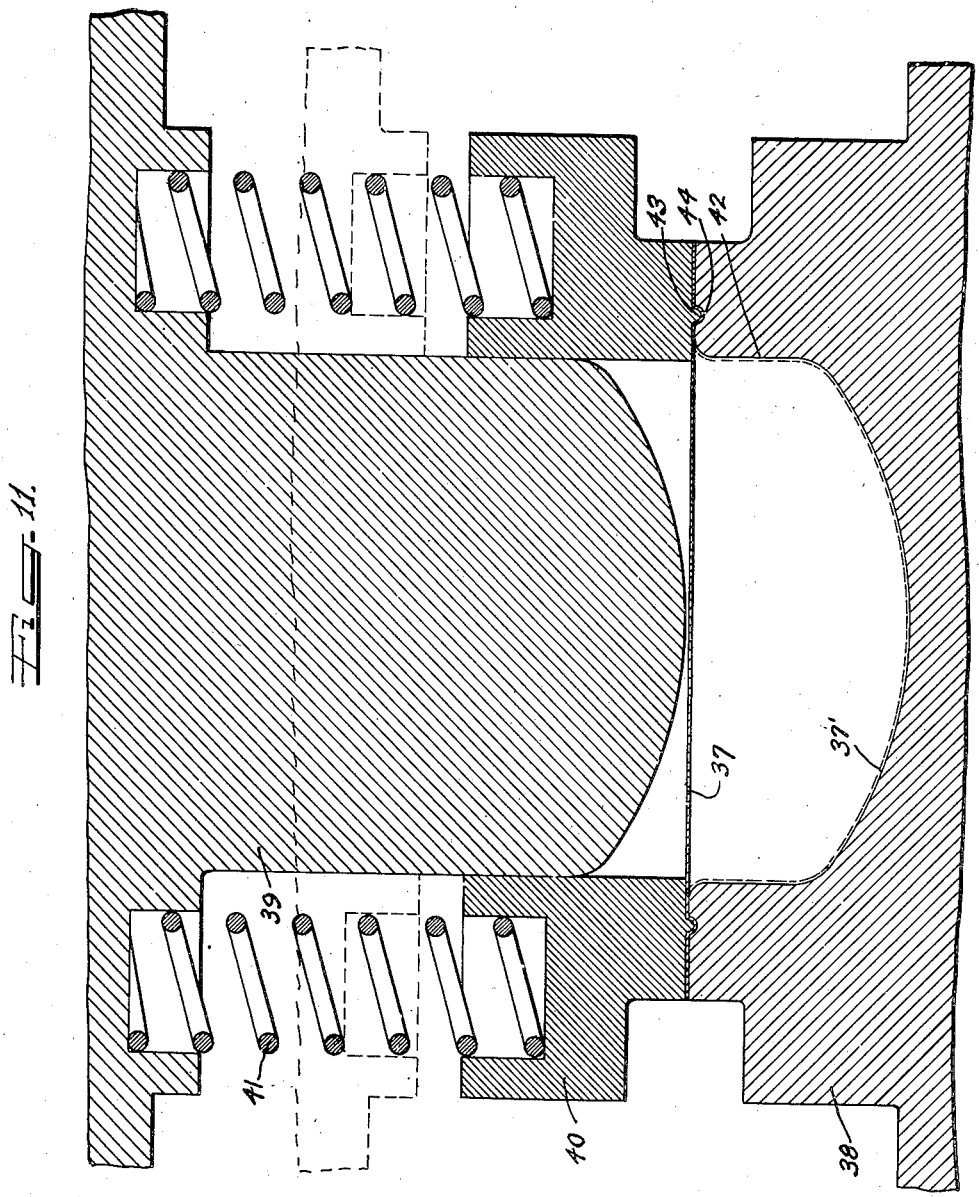

Figures 5, 6, 7, 8, and 9 are cross sectional views showing further successive steps in the formation of the hub cap shown in Figures 1 and 2, some of these views also illustrating the apparatus employed in performing these steps;

Figure 10 is a cross sectional view similar to Figure 5 showing a modified form of apparatus for performing the steps illustrated in Figure 5; and Figure 11 is a cross sectional view through a die set and blank for carrying out the first step in the formation of the hub cap when it is desired to make a hub cap without simultaneously making a wheel cover disk.

As shown on the drawings:

The reference character 10 designates generally a conventional drop center tire rim, including the usual side flanges 11 and a base flange 12, to which is riveted, welded, or otherwise secured, a spider or body member 13 which has a central depression or bolt access opening 14, defined by a lateral wall 15 terminating in a bolt flange 16. This bolt flange 16 is adapted to be secured in the usual way, such as by cap screws or bolts, to a suitable circular support or hub of the automobile.

As is well known to those skilled in the automobile wheel art, it is common practice to provide a detachable closure member for concealing these bolts. A closure or cap member constructed in accordance with the features of this invention is shown in Figures 1 and 2 and is designated generally by the reference character 20. The closure member, as I shall describe more in detail hereinafter, is adapted to have a snap-on coaction with a plurality of lateral projections or bumps 19 on the wall 15 of the wheel body part 13. These projections may, if it is so desired, be attached to this body part, although the preferable way of providing them is to depress spaced portions of the body part at the time that the body or spider part is being fabricated.

Each of these projections 19 is of relatively narrow width and of a predetermined height for coaction with a flexible skirt 21 on the hub cap or cover member 20. While any suitable number of projections may be used, I have found that satisfactory results may be obtained by using four equidistantly spaced projections.

The hub cap 20 is made from a single sheet or piece of metal and, in addition to the skirt 21, includes a dome or crown portion 22 connected to the skirt 21 by a turned under margin 23, which defines a shoulder adapted to seat on the outer face of the wheel body member 13, as shown in Figure 1. Also, the innermost extremity or edge of the flexible skirt 23 is curled into a small wire-like bead 25 for enhancing the tension of the rear edge of the cap, particularly when this edge is sprung into hub cap retaining cooperation with the spaced projections 19.

The dome portion 22 of the hub cap is resilient to the extent that it is like a spring in that it is capable of resisting impact blows and, moreover, will enable slight indentations therein to be snapped or pressed outwardly by manual pressure on the inner side of the indentation.

The skirt 21, by reason of its extending in a generally axial direction has its greatest flexibility at its inner edge 25. Moreover, when this skirt is in a sprung condition on the wheel, it does not materially affect the remaining portions of the hub cap by reason of the fact that it emanates from a shoulder 23 on the cap which is held and seated tightly against an outer face of the wall of body part 13.

The shoulder 23 is between the flexible dome and flexible skirt and by reason of its being located at the turned and channeled section of the margin of the cap is relatively rigid so that it can withstand without distortion or buckling the pressure of a pry-off tool inserted between the edge of this shoulder and the adjoining wheel body. In the application of the hub cap to the wheel, it is first brought to a position in which the bead 25 rests against the protuberances 19 at points spaced axially outwardly of the final point of contact between the bead 25 and the protuberances 19. The hub cap is then forced bodily axially inwardly and snapped into place, the portions of the bead 25 in contact with the protuberances 19 and the adjacent portions of the skirt 21 of the hub cap are deflected radially inwardly during this operation, while the intermediate portions of the bead 25 and skirt 21 spring radially outwardly. In its final position, shown in Figure 1, the bead 25 and the skirt 21 of the hub cap are in the above described flexed position, thereby tightly and flexibly binding the edge under tension to the body part of the wheel so as to detachably retain the hub cap on the wheel. This coaction is of such a magnitude that it requires the use of a pry-off tool, such as a screw driver, as well as considerable pressure, to remove the cap from the wheel; this removal being effected by inserting the edge of the screw driver between the relatively rigid lateral shoulder 23 of the cap and the wheel body member 13, and prying the cap outwardly.

The wheel construction, as illustrated in Figure 1, is also provided with a wheel cover disk 27 having an inner part 28 overlying the wheel body 13 and an outer part 29 overlying a portion of the rim 10. The wheel cover disk 27 is retained in place on the wheel by its axially inner edge which fits in under and is secured by the turned-under margin 23 of the hub cap 20. If desired, the wheel cover disk 27 may also be held in place by a frictional engagement of its outer marginal edge 30 with the axially inner surface of the side flange 11 of the rim 10.

In Figures 3 to 8 of the drawings, I have illustrated a novel method of making the hub cap 20 and the wheel cover disk 27 illustrated in Figures 1 and 2, which method provides a very economical manufacturing process. More particularly, both the hub cap 20 and the wheel cover disk 27 are blanked from a single piece of thin sheet metal stock 32. The first step in the process of forming the hub cap 20 and the wheel cover disk 27 comprises taking a circular blank of suitable size and drawing it, by one or more operations, into the shape shown in cross section in Figure 3. It will be noted that this shape comprises a central rounded crown portion 33 joined by a cylindrical wall portion 34 to a wide rim or disk portion 35. The wall portion 34 has the same diameter as the skirt portion 21 of the finished hub cap, and the outer rim or disk portion 35 has approximately the same outside diameter and the same general configuration as the finished wheel cover disk 27.

After the blank 32 has been formed to the shape shown in Figure 3, it is divided into two parts by being cut along a circle whose position is indicated in Figure 3 by the the lines 36. The diameter of this circle is the same as the inside diameter of the finished wheel cover disk 27, and the wheel cover disk 27 is completely formed by shaping the severed disk portion to the final form shown in Figure 4.

The central portion of the partially formed blank shown in Figure 3, this central portion comprising the crown 33, the cylindrical wall 34, and the radially inner part of the disk 35 lying between the lines 36, is subjected to further operations and finally forms the finished hub cap 20. If it is desired to produce a hub cap 20 without producing a wheel cover disk 27, a circular sheet metal blank 37, considerably smaller than the blank 32 may be employed in making a partially formed hub cap similar to the central portion of the partially formed hub cap and wheel cover disk shown in Figure 3. In carrying out this alternative procedure, the blank 37, as shown in Figure 11, is placed in a suitable die set comprising a die 38, a punch 39, and a blank holder 40 connected to the punch by suitable springs 41. The die 38 is formed with a central recess 42 into which the punch 39 is adapted to draw the blank 37, and the die 38 and the blank holder 40 are provided with a circular tongue 43 and groove 44 concentric with the recess 42 of the die. The tongue 43 and groove 44 provide a tortuous passage through which the edge of the blank 37 is drawn. This serves to more effectually hold the edge of the blank 37 and also to cold work, to an additional extent, that portion of the blank being drawn through the tortuous passage and to thereby enhance its physical properties. When the stroke of the punch 39 is completed, the blank 37 has been drawn to the shape indicated by the dotted line 37' and has substantially the same shape as the portion of the member shown in Figure 3 and lying between the lines 36.

The partially formed hub cap, made by either of the steps described above, is then subjected to a further drawing operation, as illustrated in Figure 5. Figure 5 shows a portion of a die set generally similar to the die set shown in Figure 11 in that it comprises a die 46 having a central circular opening 47, a punch 48, and an annular blank holder 49 fitting around the punch 48 above the die 46. Since both sides of the die set are alike, one side only is illustrated in Figure 5. The principal differences between the die set illustrated in Figure 5 and the die set illustrated in Figure 11 are that, in the former die set, the aperture 47 in the die 46 extends clear through the die so that the piece being worked upon can be discharged through the opening, and in that the blank holder 49 is provided with a lip 50 which is adapted to extend down into the die 46 inside of the cylindrical wall 34 of the blank being worked upon. It will be noted that the blank is formed with a fillet portion 45 between the cylindrical wall portion 34 and the relatively flat rim portion 35 and that the fillet 45 is securely held, both on the outside and the inside, by the die 46 and the lip 50 of the blank holder 49.

The operation which is performed in the die set illustrated in Figure 5 consists of drawing all of the metal in the fillet 45 and in the flange 35 into an extension of the cylindrical wall 34, the metal being guided throughout its entire movement into the cylindrical wall formed by means of the die 46 and the blank holder 49. The movement of the metal is, of course, caused by the downward movement of the punch 48 in the conventional manner.

After the operation performed in the die set shown in Figure 5 has been completed, the blank has the shape shown in cross section in Figure 6 and consists entirely of a crown portion 33 and a cylindrical wall portion 34. The next operation is to trim the edge of the wall portion 34 to exactly the proper length by making a cut 51 at the proper place. The cut 51 removes a small strip of waste 52 from the rim of the cylindrical portion 34 and eliminates any variation in length or irregularities in the edge of the work piece 33—34.

The next step in the formation of the hub cap, is the curling of the edge of the cylindrical wall portion 34 to form a bead 22. This operation is carried out with a curling punch 53 and die 54 having the configuration shown in Figure 7. The edge of the cylindrical wall portion 34 is forced by the die 53 into an annular round-bottomed groove or trough 55 in the die 54 and is thereby forced to curl around and form itself into the bead 22.

The next operation in the forming of the hub cap consists of bulging out the portion of the cylindrical wall 34 adjacent the crown portion 33 in order to form the edge portion of the dome 22 and the turned-under margin 23 of the finished hub cap shown in Figure 1. This operation is performed by the die set illustrated in Figures 8 and 9. This die set comprises an upper die member 55 whose under surface is formed with a round hollow 56 having the shape of the dome portion 22 of the finished hub cap, a central lower die member 57 having its upper end shaped and positioned to hold the center of the crown portion 33 of the partially completed hub cap against the center of the hollow 56 in the upper die member, a plurality of outer lower die members 58 which together form a ring adapted to fit around the cylindrical wall portion 34 of the partially formed hub cap, a rubber expander 59 in the form of a ring fitting around the upper part of the central lower die member 57 and shaped to fit against the outer part of the crown portion 33 and the upper part of the wall portion 34 of the partially completed hub cap, and an annular compressor 60 fitting between the central and outer lower die members 57 and 58 immediately below the rubber expander 59. It will be noted that the outer lower die members 58 are formed with an undercut 61 on their inner surfaces, this undercut accommodating the bead 22 and terminating in a shoulder 62 near the top. When the partially formed hub cap 33—34—22 is placed in the dies, the bead 22 on its lower edge lies some distance below the shoulder 62 on the outer lower die members, as shown in Figure 8.

The die set shown in Figures 8 and 9 is operated by forcing the upper die member 55, the central lower die member 57 and the outer lower die members 58 downwardly with respect to the compressor 60. This forces the rubber expander 59 down onto the compressor 60 and, since rubber is practically incompressible volumetrically, causes the expander 59 to bulge out laterally as shown in Figure 9. This bulging forces the upper portion of the cylindrical wall 34 out into the peripheral portion of the hollow 56 in the upper die member 55 and draws the bead 22 up against the shoulder 62 on the outer lower die members 58. The pressure applied is sufficient to pull the bead 22 up tightly against the shoulder 62 around its entire circumference. If any portion of the bead 22 should pull up against the shoulder 62 before any other portion, that first portion is stopped and prevented from pulling up further by the shoulder 62 until the other portions are pulled up into line. Thus the bead 22 is formed into a perfect circle irrespective of any small irregularities that may occur during the drawing operation. This completes the formation of the hub cap 20, with the exception, of course, of such operations as polishing and embossing or painting ornamental or identifying features.

An alternative set of dies 64—65—66, shown in Figure 10, may be employed for carrying out the steps performed by the dies shown in Figure 5. This alternative set of dies comprises an annular lower die member 64, a punch 65, and an annular blank holder 66 adapted to fit around the punch 65 and on top of the die 64. The die set 64—65—66 is generally similar to the die set shown in Figure 5, but the lip 67 on the lower inner corner of the blank holder 66 is considerably thinner than the corresponding lip 50 on the other die set. This allows the side of the punch 65 to be made straight and of a constant diameter instead of having the upper portion of reduced diameter, as is the case with the punch 48 in the die set shown in Figure 5.

From the foregoing, it will be seen that I have provided a method of producing hub caps and wheel cover disks or of producing hub caps alone which involves less waste of material and fewer operations than previously known methods of producing these articles. It will therefore be apparent that my invention brings about a substantial reduction in the manufacturing cost of these articles. While I have disclosed only one principal way of carrying out the invention and two modifications thereof, it will, of course, be understood that I do not wish to be limited thereto, since many modifications may be made, and I, therefore, contemplate by the appended claims to cover all such modifications as fall within the true spirit and scope of my invention.

I claim as my invention:

1. The method of making a round sheet metal object having a bulged out portion and a rim, said bulged out portion being of greater diameter than the rim, which comprises drawing a flat blank of sheet metal into an intermediate shape having a crown portion and a cylindrical wall portion with a cross-section similar in size and shape to the rim of the finished object and having an outwardly extending flange connected to said cylindrical wall portion by a fillet, drawing the metal in said flange and said fillet into an addition to said cylindrical wall portion while positively guiding said metal around said fillet on both the inner and outer surfaces thereof, trimming the edge of said wall portion and thereby eliminating any irregularities therein caused by said drawing operations, and bulging out a portion of said cylindrical wall portion by internal pressure while holding the remaining portion of said cylindrical wall against deformation in a direction perpendicular to said wall and drawing said remaining portion and said edge toward said crown portion during the bulging out operation, and positively stopping the movement of said edge toward said crown portion during the last steps of said bulging out operation at a predetermined uniform distance from said crown portion to remove any undulations developed in the edge as said portion of the cylindrical wall is bulged out and as said remaining portion is drawn toward the crowned portion.

2. The method of making a round sheet metal object having a bulged out portion and a rim, the bulged portion being of greater diameter than the rim, which comprises working a sheet metal blank into an intermediate shape, said intermediate shape having a crown portion and a cylindrical wall portion merging into said crown portion at one end and terminating in an edge of predetermined definite shape at the other end, bulging out a portion of said cylindrical wall adjacent said crown while holding the remaining portion of said cylindrical wall against deformation and drawing said remaining portion and said edge towards said crown portion during the bulging out operation, and positively stopping the movement of said edge towards said crown portion at a predetermined line.

3. The method of making a round sheet metal object having a bulged out portion and a rim, the bulged out portion being of greater diameter than the rim, which comprises working a sheet metal blank into an intermediate shape, said intermediate shape having a crown portion and a cylindrical wall portion merging into said crown portion at one end and terminating in an exactly circular edge at the other end, bulging out a portion of said cylindrical wall adjacent said crown while holding the remaining portion of said cylindrical wall against deformation and drawing said remaining portion and said edge towards said crown portion during the bulging out operation, and positively stopping the movement of said edge towards said crown at a predetermined uniform distance from said crown.

4. The method of making a round sheet metal object having a bulged out portion and a rim, the bulged out portion being of greater diameter than the rim, which comprises working a sheet metal blank into an intermediate shape, said intermediate shape having a crown portion and a cylindrical wall portion merging into said crown portion at one end and terminating in an edge of predetermined definite shape at the other end, bulging out a portion of said cylindrical wall adjacent said crown while holding the remaining portion of said cylindrical wall against deformation in a direction perpendicular to said wall and drawing said remaining portion and said edge towards said crown portion during the bulging out operation, and positively stopping the movement of said edge towards said crown portion at a predetermined line while continuing to apply a bulging out force to said first portion of said originally cylindrical wall.

5. The method of making a round sheet metal object having a beaded rim and a bulged out portion of greater diameter than said rim, which comprises working a sheet metal blank into an intermediate shape, said intermediate shape having a crown portion and a cylindrical wall portion merging into said crown portion at one end and terminating in a free edge, trimming said free edge at a predetermined uniform distance from said crown portion, curling said edge to form a bead, bulging out a portion of said cylindrical wall adjacent said crown while holding the remaining portion of said cylindrical wall and said bead against deformation in a direction perpendicular to said wall and drawing said remaining portion and said bead towards said crown portion during the bulging operation, and positively stopping the movement of said bead towards said crown portion at a predetermined uniform distance from said crown portion and before the bulging operation is completed.

GEORGE ALBERT LYON.